United States Patent
Pfaadt et al.

(10) Patent No.: US 8,202,947 B2
(45) Date of Patent: Jun. 19, 2012

(54) MIXTURES FOR PRODUCING BIODEGRADABLE ALIPHATIC POLYESTER-BASED MOLDED BODIES AND FOR PRODUCING POLYMER POWDERS THAT CAN BE RE-DISPERSED IN WATER

(75) Inventors: Marcus Pfaadt, Burghausen (DE); Robert Tangelder, NR Laren (NL)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/123,878

(22) PCT Filed: Oct. 14, 2009

(86) PCT No.: PCT/EP2009/063403
§ 371 (c)(1),
(2), (4) Date: Apr. 12, 2011

(87) PCT Pub. No.: WO2010/043648
PCT Pub. Date: Apr. 22, 2010

(65) Prior Publication Data
US 2011/0207858 A1    Aug. 25, 2011

(30) Foreign Application Priority Data
Oct. 16, 2008    (DE) .......................... 10 2008 042 893

(51) Int. Cl.
C08G 63/08    (2006.01)
C08G 18/62    (2006.01)
(52) U.S. Cl. ....................................... 525/450; 525/451
(58) Field of Classification Search .................. 525/450, 525/451
See application file for complete search history.

(56) References Cited

U.S. PATENT DOCUMENTS

| | | | |
|---|---|---|---|
| 4,115,336 A * | 9/1978 | Crouzet | 523/501 |
| 5,075,364 A * | 12/1991 | Phan et al. | 524/190 |
| 5,726,220 A | 3/1998 | Tokushige et al. | |
| 6,096,809 A | 8/2000 | Lorcks et al. | |
| 2003/0191231 A1* | 10/2003 | Martin et al. | 524/513 |
| 2005/0084334 A1* | 4/2005 | Shi et al. | 405/129.9 |
| 2005/0151296 A1 | 7/2005 | Obuchi et al. | |
| 2006/0264539 A1* | 11/2006 | Mosseveld et al. | 524/47 |
| 2008/0188597 A1 | 8/2008 | Moriyama et al. | |
| 2008/0281018 A1 | 11/2008 | Seeliger et al. | |
| 2009/0030168 A1 | 1/2009 | Schorm et al. | |
| 2009/0131561 A1 | 5/2009 | Pfaadt et al. | |

FOREIGN PATENT DOCUMENTS

| | | |
|---|---|---|
| DE | 10 2006 006 580 A1 | 8/2007 |
| DE | 10 2006 007 282 A1 | 8/2007 |
| WO | WO 96/31561 A1 | 10/1996 |
| WO | WO 98/40434 A1 | 9/1998 |
| WO | WO 2005/059031 | 6/2005 |
| WO | WO 2006/074815 A1 | 7/2006 |
| WO | WO 2007/093518 A | 8/2007 |

OTHER PUBLICATIONS

Mohanty et al., Macromol. Mater. Eng. 276/277, 1-24, 2000.*
Xing P et al.: "Miscibility and Crystallization of Poly(Beta-Hydroxybutryrate)/ Poly (Vinyl Acetate-Co-Vinyl Alcohol) Blends", Macromolecules 2000, ACS, Washington, DC, US, vol. 31, No. 20, Oct. 6, 1998, pp. 6898-6907.
Ullmanns Encyclopedia of Industrial Chemistry, 7th Edition, Online Version, DOI 10.1002/14356007.
Schulze J. in TIZ, No. 9, 1985.
Fox T. G., Bull. Am. Physics Soc. 1, 3, p. 123, (1956).
Polymer Handbook 2nd Edition, J. Wiley & Sons, New York (1975).

* cited by examiner

*Primary Examiner* — Liam Heincer
(74) *Attorney, Agent, or Firm* — RatnerPrestia

(57) ABSTRACT

Mixtures for producing biodegradable molded bodies are based on one or more aliphatic polyesters, wherein the mixtures also include one or more polymer powders that can be re-dispersed in water.

11 Claims, No Drawings

# MIXTURES FOR PRODUCING BIODEGRADABLE ALIPHATIC POLYESTER-BASED MOLDED BODIES AND FOR PRODUCING POLYMER POWDERS THAT CAN BE RE-DISPERSED IN WATER

CROSS REFERENCE TO RELATED APPLICATIONS

This application is the national phase filing of international patent application No. PCT/EP2009/063403, filed 14 Oct. 2009, and claims priority of German patent application number 10 2008 042 893.0, filed 16 Oct. 2008, the entireties of which applications are incorporated herein by reference.

FIELD OF THE INVENTION

The invention relates to mixtures for producing biodegradable moldings based on aliphatic polyesters and water-redispersible polymer powders, and also to methods for producing biodegradable moldings by means of said mixtures, and to the use thereof.

BACKGROUND OF THE INVENTION

Aliphatic polyesters such as polylactic acid are used for producing biodegradable moldings, as for example packaging films for the food industry. Polylactic acid, however, can also be spun to form fibers, and is therefore employed as pillow filling, carpet fibers, and cosmetics wipes. A problem is the brittleness of aliphatic polyesters.

WO 96/31561 A1 addresses the unsatisfactory materials properties obtained when aliphatic polyesters are used to produce biodegradable moldings. Proposed accordingly are mixtures, based on starch, which additionally comprise at least one further biopolyester, examples being aromatic polyesters, polyesteramides. Mixtures of polylactic acid with starch, plasticizer, and a thermoplastic polymer, such as polyvinyl alcohol or ethylene-vinyl alcohol copolymers, are proposed in WO 98/40434 A1. WO 2005/059031 proposes improving the properties of moldings based on polylactic acid by adding a crosslinkable impact modifier. A proposed impact modifier is an ethylene-(meth)acrylate copolymer which comprises (meth)acrylate units with epoxy groups. US 2008/0188597 A1 describes mixtures for producing biodegradable moldings that comprise as their biodegradable component aliphatic polyesters, more particularly polylactic acid. For the purpose of improving the mechanical strength, the aliphatic polyesters are blended with a thermoplastic having a relatively high Tg of $\leq 80°$ C., such as polystyrene or PMMA, for example. To improve the flame retardation, an organic phosphoric acid is added. WO 2006/074815 A1 proposes improving the properties of the end products and avoiding the costly and inconvenient preliminary drying of polylactic acid before its thermoplastic processing by using aliphatic polyesters such as polylactic acid in a mixture with aliphatic-aromatic polyesters, and, more particularly, using epoxide crosslinkers as well, such as epoxy-functional polymers or bisphenol A epoxides. U.S. Pat. No. 5,726,220 proposes producing biodegradable moldings from a mixture of polylactic acid with ethylene-vinyl acetate copolymer.

A problem affecting the blending of polylactic acid with other, more flexible biopolyesters and/or thermoplastics is the unsatisfactory miscibility of the individual components.

The object was therefore to provide compositions based on aliphatic polyesters, more particularly polylactic acid, which are distinguished not only by good processing properties but also by improved mechanical

SUMMARY OF THE INVENTION

Surprisingly it has been found that water-redispersible polymer powders have excellent miscibility with aliphatic polyesters and are also compatible with mixtures of polylactic acid with other biopolyesters (aliphatic polyesters, aliphatic-aromatic polyesters), and also improve the mechanical properties of moldings based on biopolyesters.

DETAILED DESCRIPTION OF THE INVENTION

The invention provides mixtures for producing biodegradable moldings based on one or more aliphatic polyesters, characterized in that the mixtures further comprise one or more water-redispersible polymer powders.

Suitable aliphatic polyesters are, for example, polylactic acid (PLA), polyhydroxy fatty acids (polyhydroxyalkanoates) such as poly-3-hydroxybutanoic acid (PHB), polyalkylene succinates or polyalkylene. adipates of $C_2$ to $C_6$ alkylenes, such as polybutylene succinate or polybutylene adipate, for example. Polylactic acid is preferred. By polylactic acid here is meant homopolymers of L-lactic acid, of D-lactic acid or of racemic mixtures of L- and D-lactic acid. By polylactic acid is also meant copolymers which as well as the lactic acid units also comprise further comonomer units. Examples are lactic acid copolymers with hydroxybutyric acid, caprolactone and/or glycolic acid units. The fraction of the comonomer units in this case is <50 mol %, preferably <10 mol %.

The stated aliphatic polyesters may be prepared by means of known polymerization processes, such as polycondensation or ring-opening polymerization, for example, or by means of known microbiological processes (Ullmann's Encyclopedia of Industrial Chemistry, 7th edition, online version, DOI 10.1002/14356007). Polylactic acid is available commercially in the form of NatureWorks$^R$ PLA, for example. Polyhydroxybutyric acid is available commercially in the form of Biomer$^R$ polyesters.

It has been found that the water-redispersible polymer powders also make it possible for polylactic acid to be blended with other aliphatic polyesters or aliphatic-aromatic polyesters. The mixture of the invention therefore encompasses preferably not only mixtures of polylactic acid with water-redispersible polymer powders, but also compositions with mixtures of polylactic acid with other aliphatic polyesters and water-redispersible polymer powders, and mixtures of polylactic acid with aliphatic-aromatic polyesters, optionally aliphatic polyesters other than polylactic acid, and water-redispersible polymer powders. Suitable aliphatic-aromatic polyesters are, for example, the semiaromatic polyesters specified in WO 2006/074815 A1. One such product is available commercially in the form of EastarBio$^R$. Besides the stated biopolyesters, the mixtures may also comprise biopolymers such as starches, proteins or cellulose esters. The mixtures preferably do not contain any starch.

Water-redispersible polymer powders are powder compositions which are obtainable by means of drying of the corresponding aqueous dispersions of the base polymers in the presence of protective colloids. On the basis of this preparation process, the finely divided resin of the dispersion is coated with a water-soluble protective colloid in sufficient amount. In the course of drying, the protective colloid acts like a jacket, preventing the particles sticking together. On redispersion in water, the protective colloid dissolves again in water, to give an aqueous dispersion of the original polymer particles (Schulze J. in TIZ, No. 9, 1985).

Suitable polymers are those based on one or more monomers from the group encompassing vinyl esters, (meth) acrylic esters, vinyl aromatics, olefins, 1,3-dienes, and vinyl halides, and optionally other monomers copolymerizable therewith.

Suitable vinyl esters are those of carboxylic acids having 1 to 15 C atoms. Preference is given to vinyl acetate, vinyl propionate, vinyl butyrate, vinyl 2-ethylhexanoate, vinyl laurate, 1-methylvinyl acetate, vinyl pivalate, and vinyl esters of α-branched monocarboxylic acids having 9 to 11 C atoms, examples being VeoVa9$^R$ or VeoVa10$^R$ (trade names of the company Resolution). Vinyl acetate is particularly preferred.

Suitable monomers from the group of acrylic esters or methacrylic esters are esters of unbranched or branched alcohols having 1 to 15 C atoms. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, tert-butyl acrylate, tert-butyl methacrylate, and 2-ethylhexyl acrylate. Particularly preferred are methyl acrylate, methyl methacrylate, n-butyl acrylate, tert-butyl acrylate, and 2-ethylhexyl acrylate.

Preferred vinyl aromatics are styrene, methylstyrene, and vinyltoluene. A preferred vinyl halide is vinyl chloride. The preferred olefins are ethylene, propylene, and the preferred dienes are 1,3-butadiene and isoprene.

Optionally it is possible for 0.1% to 5% by weight, based on the total weight of the monomer mixture, of auxiliary monomers to be copolymerized additionally. It is preferred to use 0.5% to 2.5% by weight of auxiliary monomers. Examples of auxiliary monomers are ethylenically unsaturated monocarboxylic and dicarboxylic acids, preferably acrylic acid, methacrylic acid, fumaric acid, and maleic acid; ethylenically unsaturated carboxamides and carbonitriles, preferably acrylamide and acrylonitrile; monoesters and diesters of the fumaric acid and maleic acid such as the diethyl and diisopropyl esters, and also maleic anhydride; ethylenically unsaturated sulfonic acids and/or salts thereof, preferably vinylsulfonic acid, 2-acrylamido-2-methylpropane-sulfonic acid. Further examples are precrosslinking comonomers such as polyethylenically unsaturated comonomers, examples being diallyl phthalate, divinyl adipate, diallyl maleate, allyl methacrylate or triallyl cyanurate, or post-crosslinking comonomers, examples being acrylamidoglycolic acid (AGA), methylacrylamidoglycolic acid methyl ester (MAGME), N-methylolacrylamide (NMA), N-methylolmethacrylamide, N-methylolallyl carbamate, alkyl ethers such as the isobutoxy ether or esters of N-methylolacrylamide, of N-methylolmethacrylamide, and of N-methylolallyl carbamate. Also suitable are epoxide-functional comonomers such as glycidyl methacrylate and glycidyl acrylate. Further examples are silicon-functional comonomers, such as acryloyloxypropyltri(alkoxy)- and methacryloyloxypropyltri(alkoxy)silanes, vinyl-trialkoxysilanes and vinylmethyldialkoxysilanes, where as alkoxy groups there may be, for example, ethoxy and ethoxypropylene glycol ether radicals present. Mention may also be made of monomers having hydroxyl or CO groups, examples being methacrylic and acrylic hydroxyalkyl esters such as hydroxyethyl, hydroxypropyl or hydroxybutyl acrylate or methacrylate, and also compounds such as diacetoneacrylamide and acetylacetoxyethyl acrylate or methacrylate.

The monomer selection, and the selection of the weight fractions of the comonomers, are made such as to result, generally, in a glass transition temperature Tg of ≦120° C., preferably −40° C. to +80° C., more preferably −20° C. to +50° C. The glass transition temperature Tg of the polymers may be determined in a known way by means of differential scanning calorimetry (DSC). The Tg may also be calculated approximately in advance by means of the Fox equation. According to Fox T. G., Bull. Am. Physics Soc. 1, 3, page 123 (1956), the following is true: $1/Tg=x1/Tg1+x2/Tg2+\ldots+xn/Tgn$, where xn stands for the mass fraction (% by weight/100) of the monomer n, and Tgn is the glass transition temperature, in kelvins, of the homopolymer of the monomer n. Tg values for homopolymers are listed in Polymer Handbook, 2nd edition, J. Wiley & Sons, New York (1975).

Preference is given to homopolymers or copolymers which comprise one or more monomers from the group consisting of vinyl acetate, vinyl esters of α-branched monocarboxylic acids having 9 to 11 C atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate, and styrene. Particularly preferred are copolymers with vinyl acetate and ethylene; with vinyl acetate, ethylene, and a vinyl ester of α-branched monocarboxylic acids having 9 to 11 C atoms; with n-butyl acrylate and 2-ethylhexyl acrylate and/or methyl methacrylate; with styrene and one or more monomers from the group consisting of methyl acrylate, ethyl acrylate, propyl acrylate, n-butyl acrylate, and 2-ethylhexyl acrylate; with vinyl acetate and one or more monomers from the group consisting of methyl acrylate, ethyl acrylate, propyl acrylate, n-butyl acrylate, 2-ethylhexyl acrylate, and optionally ethylene; with 1,3-butadiene and styrene and/or methyl methacrylate and also, optionally, further acrylic esters; the stated mixtures may optionally further comprise one or more of the abovementioned auxiliary monomers.

The polymers are prepared by the emulsion polymerization process or by the suspension polymerization process in the presence of protective colloids, preferably by the emulsion polymerization process, where the polymerization temperature is generally 20° C. to 100° C., preferably 60° C. to 90° C., and in the case of the copolymerization of gaseous comonomers such as ethylene it is also possible to operate under superatmospheric pressure, generally between 5 bar and 100 bar. The polymerization is initiated using the water-soluble and/or monomer-soluble initiators or redox initiator combinations that are common for emulsion polymerization or suspension polymerization, respectively. Examples of water-soluble initiators are sodium persulfate, hydrogen peroxide, and azobisisobutyronitrile. Examples of monomer-soluble initiators are dicetyl peroxydicarbonate, dicyclohexyl peroxydicarbonate, and dibenzoyl peroxide. The stated initiators are used generally in an amount of 0.01% to 0.5% by weight, based on the total weight of the monomers. Redox initiators used are combinations of the stated initiators in combination with reducing agents. Suitable reducing agents are, for example, sodium sulfite, sodium hydroxymethanesulfinate, and ascorbic acid. The amount of reducing agent is preferably 0.01% to 0.5% by weight, based on the total weight of the monomers.

For controlling the molecular weight it is possible to use regulating substances during the polymerization. If regulators are used, they are employed typically in amounts between 0.01% to 5.0% by weight, based on the monomers to be polymerized, and are added separately or else as a premix with reaction components. Examples of such substances are n-dodecyl mercaptan, tert-dodecyl mercaptan, mercaptopropionic acid, methyl mercaptopropionate, isopropanol, and acetaldehyde. It is preferred not to use any regulating substances.

For stabilizing the polymerization batch, protective colloids are used, optionally in combination with emulsifiers. Suitable protective colloids are partially hydrolyzed or fully hydrolyzed polyvinyl alcohols; polyvinylpyrrolidones; polyvinyl acetals; polysaccharides in water-soluble form such as starches (amylose and amylopectin) or dextrins or cyclodextrins, celluloses and their carboxymethyl, methyl, hydroxyethyl, and hydroxypropyl derivatives; proteins such as casein or caseinate, soy protein, gelatin; lignosulfonates; synthetic polymers such as poly(meth)acrylic acid, copolymers of (meth)acrylates with carboxyl-functional comonomer units, poly(meth)acrylamide, polyvinylsulfonic acids, and their water-soluble copolymers; melamine-formaldehyde sulfonates, naphthalene-formaldehyde sulfonates, styrene-maleic acid copolymers and vinyl ether-maleic acid copolymers. Preferred are partially hydrolyzed or fully hydrolyzed polyvinyl alcohols. Particularly preferred are partially hydrolyzed polyvinyl alcohols having a degree of hydrolysis of 80 to 95 mol % and a Höppler viscosity in 4% strength aqueous solution of 1 to 30 mPas (Höppler method at 20° C., DIN 53015).

After the conclusion of the polymerization, residual monomers may be removed by postpolymerization, employing known methods, as for example by means of postpolymerization initiated with redox catalyst. Volatile residual monomers may also be removed by distillation, preferably under reduced pressure, and optionally with inert entraining gases such as air, nitrogen or steam being passed through or over the batch. The aqueous dispersions obtainable in this way have a solids content of 30% to 75% by weight, preferably of 50% to 60% by weight.

For preparing the water-redispersible polymer powder compositions, the dispersions, optionally after addition of further protective colloids as drying aids, are dried, by means of fluidized-bed drying, freeze drying or spray drying, for example. The dispersions are preferably spray-dried. Spray drying in this case takes place in customary spray-drying systems, where the atomization may take place by means of one-fluid, two-fluid or multifluid nozzles or with a rotating disk. The exit temperature selected is generally in the range from 45° C. to 120° C., preferably 60° C. to 90° C., depending on system, resin Tg, and desired degree of drying. The viscosity of the feed to be atomized is adjusted via the solids content so as to give a figure of <500 mPas (Brookfield viscosity at 20 revolutions and 23° C.), preferably <250 mPas. The solids content of the dispersion to be atomized is >35%, preferably >40%.

Generally speaking, the drying aid is used in a total amount of 0.5% to 30% by weight, based on the polymeric constituents of the dispersion. In other words, the total amount of protective colloid before the drying operation is to be at least 1% to 30% by weight, based on the polymer fraction; it is preferred to use 5% to 20% by weight, based on the polymer fraction.

Suitable drying aids are known to the skilled person and are, for example, the protective colloids already specified. Particularly preferred are partially hydrolyzed polyvinyl alcohols having a degree of hydrolysis of 80 to 95 mol % and a Höppler viscosity in 4% strength aqueous solution of 1 to 30 mPas (Höppler method at 20° C., DIN 53015).

At the atomizing stage, an amount of up to 1.5% by weight of antifoam, based on the base polymer, has proven favorable in many cases. For prolonging the shelf life by improving the blocking stability, particularly in the case of powders with a low glass transition temperature, the powder obtained may be furnished with an antiblocking agent (anticaking agent), preferably 1% to 30% by weight, based on the total weight of polymeric constituents. Examples of antiblocking agents are Ca and Mg carbonate, talc, gypsum, silica, kaolins such as metakaolin, and silicates, having particle sizes preferably in the range from 10 nm to 10 µm.

Most preferable are redispersion powder compositions comprising vinyl acetate homopolymers, or copolymers with vinyl acetate and ethylene, or copolymers with vinyl acetate, ethylene, and a vinyl ester of α-branched monocarboxylic acids having 9 to 11 C atoms, as film-forming polymer and partially hydrolyzed polyvinyl alcohol as protective colloid.

It is often particularly advantageous to use mixtures of water-redispersible polymer powders having a relatively low Tg of −20° C. to +20° C., examples being those based on copolymers of vinyl acetate and ethylene, with water-redispersible polymer powders having a relatively high Tg of +30° C. to +60° C., examples being those based on vinyl acetate homopolymer. While the polymer powder of relatively low Tg allows the flexibility of the moldings to be optimized, the polymer powder of relatively high Tg optimizes the strength of the moldings.

The redispersible polymer powders may also be used in a mixture with conventional, nonredispersible thermoplastics (thermoplastic). Examples of conventional thermoplastics are polyethylene, polypropylene, PVC, ABS, and solid polyvinyl acetate resin. The weight fraction of these thermoplastics in the mixture with the redispersible polymer powder ought preferably not to exceed 70% by weight. The redispersible polymer powder may optionally also be used in a mixture with crosslinkers. Examples thereof are epoxide crosslinkers such as Epicote, or isocyanate crosslinkers.

The fraction of the water-redispersible polymer powders in the mixture for producing biodegradable moldings is 1% to 95% by weight, preferably 2% to 50% by weight, more preferably 5% to 40% by weight, based in each case on the total weight of biopolyester, and also, optionally, biopolymer, and redispersion powder, and also, optionally, thermoplastic.

If desired there may additionally be further additives, customary in the context of the thermoplastic processing of plastics, present in the mixture. Examples of such are dyes, pigments, stabilizers, plasticizers, lubricants, and flame retardants. Generally speaking, the amount of such additives is up to 20% by weight, preferably 1% to 10% by weight, based in each case on the total weight of the mixture for producing biodegradable moldings.

Preference is given to using fillers as well. Suitable fillers are inorganic and organic fillers. Examples of inorganic fillers are dolomite, chalk, and finely ground quartz. Preference is given to organic fillers such as wood flour, especially plant or animal fiber materials such as cotton, jute, wood, flax, sisal, hemp, coconut or leather fibers. Synthetic fibers such as polyester or polypropylene fibers may also be used.

The fillers are used generally in a polymer: filler weight ratio of 5:95 to 100:0, the polymer fraction being composed of the biopolyester fraction, optionally biopolymer fraction, the redispersible polymer powder fraction, and, optionally, thermoplastic fraction.

For producing the moldings, the aliphatic polyesters and the water-redispersible polymer powders, and also, optionally, further additives, are mixed with one another in—for example—a powder mixer or a hot mixer, and are processed to form moldings by means of the typical forming techniques. The term "molding" refers to the product of a shaping process, such as compression molding, pelletizing, granulating, and thermoplastic forming techniques, for example. Examples of thermoplastic forming processes are injection molding, injection blow-molding, film blowing, calendaring, and extruding processes. Processing takes place preferably by means of extrusion, with corresponding devolatization zone, and injection molding. The processing temperature is generally 60° C. to 200° C., preferably 90° C. to 160° C. It is preferred to operate under elevated pressure, preferably at pressures of 10 to 600 bar abs. The moldings may also be produced via the granule stage.

Surprisingly it has emerged that, with the use of water-redispersible polymer powders in the thermoplastic processing, there is no need for preliminary drying of the biopolyesters and optionally of the biopolymers, since the water vapor that is released in the course of processing is bound by the water-redispersible polymer powder. The production of moldings is therefore made considerably easier with the method according to the invention.

The products of the method are suitable for use as biodegradable moldings. For use as compostable packaging materials, examples being films, foamed filling materials, containers such as bags, bottles, pots, tubes, and blister packs. For use in compostable catering products such as compostable tableware, cutlery, drinking vessels, and drinking straws. In horticulture and landscaping, the products of the method may be used as compostable products such as mulching film, and as plant pots and growing pots. Uses as compostable products in the medical sector are those as capsule material and pill material, surgical suture material, and absorbable implants.

One use as compostable products in the camping sector is that for producing compostable tent pegs.

The blends of the invention allow significant expansion of the spectrum of applications of aliphatic polyesters. Polylactic acid (PLA) is normally difficult to process with the more flexible biopolyesters available on the market, such as partially aromatic polyesters or polyhydroxybutyric acid. By addition of water-redispersible polymer powders, the compatibility of PLA and other biopolyesters can be improved.

The examples which follow serve for further elucidation of the invention:
For testing, the following constituents were used:
Redispersible polymer powder 1 (RDP 1): Vinnex$^R$ 2510: a water-redispersible polymer powder based on a vinyl acetate homopolymer with a Tg of 43° C., stabilized with partially hydrolyzed polyvinyl alcohol.
Redispersible polymer powder 2 (RDP 2): Vinnex$^R$ 2504: a water-redispersible polymer powder based on a vinyl acetate-ethylene copolymer with a Tg of −4° C., stabilized with partially hydrolyzed polyvinyl alcohol.

Biopolymer 1 (Bio1): NatureWorks$^R$ PLA Polymer 2002D: polylactic acid from NatureWorks
Biopolymer 2 (Bio2): Eastar$^R$Bio: aliphatic-aromatic copolyester from Novamont
Lubricant (LB): Caesit 1 calcium stearate from Barlocher With the formulas set out in table 1 and table 2, at the roll temperatures reported in the tables, rolled sheets were produced, were taken off at the temperatures reported in the tables, and were subjected to compression molding to form plaques having a thickness in accordance with the requirements of the respective standard.

The melting behavior (film) was assessed visually. The density was determined in accordance with DIN 53479. The Shore D hardness was determined in accordance with DIN 53505.

The viscosity of the mixtures used was measured by means of high capillary viscometry (nozzle: 30×2) at a shear rate of 100 s$^{-1}$ and at temperatures of 150° C. (Visco1) and 170° C. (Visco2). The mechanical strength was determined by means of a tensile test in accordance with DIN EN ISO 527, and a measurement was made of the tensile stress on fracture (TSF).

The hardness of the moldings was determined as Vicat A in accordance with DIN EN ISO 306 with a weight of 1019 g. For assessment of the impact toughness (IT), the fracture mode was measured in accordance with DIN EN ISO 179-1eU.

TABLE 1

|  | C ex. 1 | Ex. 1 | C ex. 2 | Ex. 2 | Ex. 3 | C ex. 3 | Ex. 4 | C ex. 4 | Ex. 5 | Ex. 6 |
|---|---|---|---|---|---|---|---|---|---|---|
| Bio 1 [Pbw] | 100 | 90 | 90 | 90 | 70 | 70 | 70 | 50 | 50 | 50 |
| RDP 1 [Pbw] |  | 10 |  |  | 30 |  |  |  | 50 |  |
| Bio 2 [Pbw] |  |  | 10 |  |  | 30 |  | 50 |  |  |
| RDP 2 [Pbw] |  |  |  | 10 |  |  | 30 |  |  | 50 |
| LB [Pbw] | 0.5 | 0.5 | 0.5 | 0.5 | 0.5 | 0.5 | 0.5 | 0.5 | 0.5 | 0.5 |
| Roll [° C.] | 140 | 170 | 170 | 170 | 170 | 170 | 170 | 170 | 170 | 170 |
| Take-off [° C.] | 140 | 140 | 120 | 140 | 140 | 120 | 140 | 80 | 140 | 140 |
| Plaque [° C.] | 140 | 140 | 140 | 140 | 140 | 140 | 140 | 140 | 140 | 140 |
| Film | good | good | moderate | good | good | moderate | good | poor | good | good |
| Density [g/cm] | 1.333 | 1.298 | 1.323 | 1.322 | 1.269 | 1.292 | 1.300 | 1.215 | 1.245 | 1.275 |
| Shore D | 82.2 | 81.7 | 71.7 | 81.4 | 82.4 | 66.1 | 69.3 | n.m. | 81.4 | 47.1 |
| Visco1 [Pas] | 14496 | 12644 | 14585 | 14398 | 7469 | 6385 | 8103 | 547 | 5244 | 4927 |
| Visco2 [Pas] | 3355 | 1687 | 1954 | 2801 | 1539 | 619 | 2280 | n.m. | 1322 | 1922 |
| TSF [MPa] | 51.63 | 43.94 | 28.76 | 41.33 | 57.1 | 3.64 | 19.7 | n.m. | 53.27 | 6.33 |
| Vicat [° C.] | 155.7 | 153.2 | 155.2 | 149.5 |  | 109.0 | 153.2 |  |  | 53 |
| IT [kJ/m$^2$] | 10.85 | 20.8 | 6.13 | 16.72 |  |  | 20.8 |  |  |  |

TABLE 2

|  | C ex. 5 | Ex. 7 | C ex. 6 | Ex. 8 | C ex. 7 | Ex. 9 |
|---|---|---|---|---|---|---|
| Bio 1 [Pbw] | 93 | 93 | 95 | 95 | 98 | 98 |
| RDP 1 [Pbw] |  |  |  |  |  |  |
| Bio 2 [Pbw] | 7 |  | 5 |  | 2 |  |
| RDP 2 [Pbw] |  | 7 |  | 5 |  | 2 |
| LB [Pbw] | 0.5 | 0.5 | 0.5 | 0.5 | 0.5 | 0.5 |
| Roll [° C.] | 170 | 170 | 170 | 170 | 170 | 170 |
| Take-off [° C.] | 140 | 140 | 140 | 140 | 140 | 140 |
| Density [g/cm] | 1.313 | 1.307 | 1.315 | 1.308 | 1.321 | 1.316 |
| Shore D | 80.0 | 80.8 | 79 | 83.0 | 81.8 | 82.8 |
| Vicat [° C.] | 155.0 | 154.2 | 154.9 | 152.6 | 156.0 | 157.0 |
| IT [kJ/m$^2$] | 16.7 | 17.82 | 16.11 | 19.37 | 11.37 | 15.92 |

It was shown that the redispersion powders can be incorporated very easily into PLA: while a powder of PLA and biopolyester in the melt does not produce a homogeneous rolled sheet (even very small additions of a flexible biopolyester produce a considerable increase in inhomogeneities, which break up only through strong shearing action), an RD powder in any desired blend with PLA always produces a homogeneous rolled sheet (comparison of films from C ex. 2 and C ex. 3 with Ex. 1 to Ex. 6). The mechanical properties of the moldings of PLA and RDP are significantly better than those of the PLA/biopolyester blends (comparison of TSF and IT of C. ex. 2 and Ex. 1, and of C ex. 2 and Ex. 2). The ultimate properties of such a blend are controlled by the choice of the RD powder (comparison of TSF for Ex. 5 and Ex. 6).

The redispersible polymer powders can be blended in a substantially higher quantity with PLA than can the biopolyesters (biopolymers). This is evidence of the outstanding compatibility of the redispersible polymer powders with PLA. The tensile stress TSF can be maintained at a high level, whereas the tensile stress in the case of high levels of biopolyester breaks down or can no longer be measured (comparison of examples 3 and 4 with comparative example 3, and comparison of examples 5 or 6 with comparative example 4).

The invention claimed is:

1. A mixture for producing biodegradable moldings based on one or more aliphatic polyesters, the mixture further comprising one or more water-redispersible polymer powders, wherein the mixture does not contain any starch.

2. The mixture of claim 1, wherein said aliphatic polyesters comprise one or more from the group consisting of polylactic acid, polyhydroxy fatty acids, polyalkylene succinates, and polyalkylene adipates of $C_2$ to $C_6$ alkylenes.

3. The mixture of claim 1, wherein the mixture comprises polylactic acid and water-redispersible polymer powder; or polylactic acid and at least one other aliphatic polyester, and water-redispersible polymer powder; polylactic acid and at least one aliphatic-aromatic polyester, and optionally at least one aliphatic polyester other than polylactic acid, and water-redispersible polymer powder.

4. The mixture of claim 1, wherein the mixture further comprises at least one biopolymer from the group consisting of proteins and cellulose esters.

5. The mixture of claim 1, wherein said water-redispersible polymer powder comprises one or more based on vinyl acetate homopolymers, copolymers with vinyl acetate and ethylene, copolymers with vinyl acetate, ethylene, and a vinyl ester of α-branched monocarboxylic acids having 9 to 11 C atoms, in each case with partially hydrolyzed polyvinyl alcohol as protective colloid.

6. The mixture of claim 1, wherein said water-redispersible polymer powder comprises mixtures of water-redispersible polymer powders having a relatively low Tg of −20° C. to +20° C. with water-redispersible polymer powders having a relatively high Tg of +30° C. to +60° C.

7. A method for producing biodegradable moldings with a mixture as claimed in claim 1, the aliphatic polyesters and the water-redispersible polymer powders and also, optionally, further additives being mixed with one another, and being processed into moldings by means of thermoplastic forming techniques.

8. The method for producing biodegradable moldings as claimed in claim 7, additives for thermoplastic processing of plastics additionally being used.

9. The method for producing biodegradable moldings as claimed in claim 7, inorganic or organic fillers additionally being used.

10. A biodegradable molding made by the method of claim 7.

11. A compostable product made from the biodegradable molding of claim 10, selected from the group consisting of packaging materials, compostable catering products, compostable products in horticulture and landscaping, compostable products in the medical sector, and compostable products in the camping sector.

* * * * *